(12) United States Patent
Bhatt et al.

(10) Patent No.: US 6,298,088 B1
(45) Date of Patent: Oct. 2, 2001

(54) METHOD AND APPARATUS FOR SPLICING COMPRESSED INFORMATION SIGNALS

(75) Inventors: Bhavesh Bhatt, Franklin Park; Raymond Lowe, North Caldwell, both of NJ (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 08/864,310

(22) Filed: May 28, 1997

(51) Int. Cl.[7] .................................................. H04B 1/66
(52) U.S. Cl. ................................... 375/240.28; 370/522
(58) Field of Search .................................. 348/423, 845, 348/845.2, 845.3, 6, 9, 12, 13, 584, 426, 432, 465, 467, 441, 473; 370/94.1, 395, 474, 522, 487; 375/240, 240.28

(56) References Cited

U.S. PATENT DOCUMENTS

| | | | |
|---|---|---|---|
| 4,490,742 | * 12/1984 | Wurtzinger | 348/601 |
| 4,542,407 | * 9/1985 | Cooper et al. | 380/13 |
| 5,511,099 | * 4/1996 | Ko et al. | 375/368 |
| 5,534,944 | * 7/1996 | Egawa et al. | 348/584 |
| 5,579,348 | * 11/1996 | Walker et al. | 348/512 |
| 5,588,025 | * 12/1996 | Strolle et al. | 375/316 |
| 5,598,415 | * 1/1997 | Nubert et al. | 348/465 |
| 5,652,749 | * 7/1997 | Davenport et al. | 348/13 |
| 5,715,285 | * 2/1998 | Yamada | 375/376 |
| 5,801,781 | * 9/1998 | Hiroshima et al. | 348/441 |
| 5,835,493 | * 11/1998 | Magee et al. | 348/467 |
| 5,859,660 | * 1/1999 | Perkins et al. | 348/9 |
| 5,917,830 | * 6/1999 | Chen et al. | 348/473 |

* cited by examiner

Primary Examiner—Chris Kelley
Assistant Examiner—Gims Philippe
(74) Attorney, Agent, or Firm—William J. Burke

(57) ABSTRACT

A method and apparatus for splicing a first information stream into a second information stream to produce an output information stream containing compressed digital data. The first and second information streams are synchronized using a common timing reference, thereby avoiding temporal discontinuity errors in an information stream decoder.

33 Claims, 2 Drawing Sheets

METHOD AND APPARATUS FOR SPLICING COMPRESSED INFORMATION SIGNALS

The U.S. Government has certain rights in this invention pursuant to Contract No. 70NANB5H1174.

The invention relates to communication systems in general, and more particularly, the invention relates to a method and apparatus for synchronizing a plurality of compressed data streams to facilitate stream selection and other operations.

BACKGROUND OF THE DISCLOSURE

There are several major television networks providing national news and other programming to local or regional affiliate stations. These affiliate stations receive a National Television Systems Commission (NTSC) network feed via, e.g., a satellite link and synchronize the NTSC feed to a local NTSC synchronizing, or "genlock" signal. The term "genlocking" refers to the process of synchronizing one or more signals, or the equipment producing the signals, to a studio timing reference. The NTSC television signal includes synchronizing pulses which delineate horizontal lines of video and, therefore, allow for simple calculations of video field and frame locations within the NTSC signal. Thus, the affiliate is able to align the video and audio information on, e.g., a line by line, field by field, or frame by frame basis. The affiliate station may then easily insert ("splice in") advertising or local programming into the received signal. The resultant spliced signal, which includes network programming and locally inserted material, is then transmitted via, e.g., terrestrial broadcast.

In several communications systems, the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172. The second, known as MPEG-2, refers to ISO/IEC standards 13818.

The proposed use of such compressed data by a network and its affiliate poses several technical challenges since MPEG-based video and audio synchronization is not as straightforward as NTSC-based synchronization. Moreover, the affiliate station must be able to subject an MPEG data stream to operations like genlock or splicing (e.g., adding commercials to programs) prior to re-transmission by the affiliate station.

There is considerable expense involved in performing the above synchronization, splicing and other operations on a compressed (e.g., MPEG) data stream. This is because the compressed network feed or other stream must be decoded, processed and re-encoded prior to transmission to a local user. In addition to the expense, this approach also degrades the signal quality of the network fed video and audio because the steps of decoding and encoding are not entirely lossless (i.e., portions of the data representing an image may be ignored or truncated during at least the encoding process).

Therefore, a need exists in the art for a cost-efficient method and apparatus for applying splicing and other processing techniques to information contained in a compressed data stream.

SUMMARY OF THE INVENTION

A method and apparatus for processing a compressed information signal includes a timing source for providing a plurality of synchronized timing information signals to one or more compressed information processors. The information processors operate on respective compressed information signals in a synchronous manner such that it is not necessary to compare baseband or elementary information signals when performing signal splicing or insertion operations.

More specifically, an HDTV pass-through station is disclosed in which a synchronizing source provides a plurality of timing signals derived from a common frequency source. The timing signals are used to synchronize an MPEG-compliant network feed signal to MPEG-compliant live feed signals and stored feed signals such that switching or splicing amongst the three feed signals may be performed at a transport level, thereby avoiding baseband or elementary stream manipulation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of a high definition television (HDTV) pass-through station (e.g., a network affiliate station) which is operative upon MPEG-compliant information streams, including video and audio information streams. The invention provides a cost effective solution for designers of such pass-through stations. However, it must be noted that the embodiment of the invention described herein may be modified for use in other compressed data systems where, e.g., it is desirable for a plurality of information processors to operate on respective compressed information signals in a synchronous manner such that it is not necessary to compare baseband or elementary information signals when performing signal switching, splicing or insertion operations.

The MPEG standards address the timing and synchronization issues for decoders of MPEG data streams (e.g., video, audio, data, and the like) as follows. A sample of a 27 MHz referenced clock is transmitted in a program clock reference (PCR) field of a transport stream packet. The PCR indicates a time when the transport decoder is expected to have completed reading the PCR field. This information may be used by a far-end decoder, such as a high definition television receiver, to synchronize a system clock within the receiver. That is, the phase of the local clock running at the far-end decoder is compared to the PCR value in the bit stream at the instant at which the PCR is obtained to determine whether the decoding process is synchronized to ensure accurate decoding and decompression of the data stream. In general, the PCR from the transport stream does not directly change the phase of the system clock of the decoder, but only serves as an input to adjust the clock rate.

Figure 1:
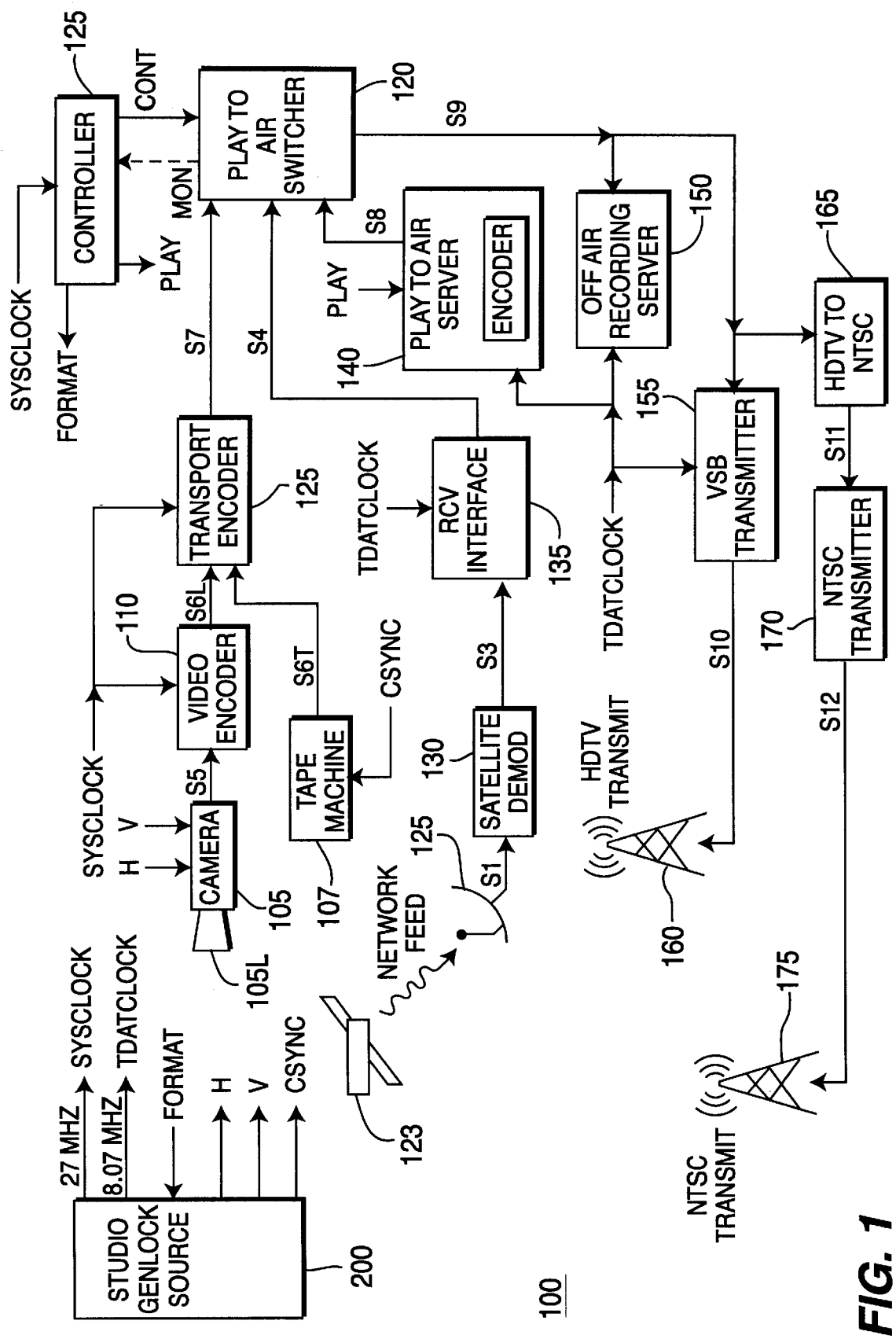
FIG. 1 shows a block diagram of a high definition television (HDTV) pass-through station according to the invention.

FIG. 1 shows a block diagram of a HDTV pass-through station 100 according to the invention. The pass-through station 100 receives a compressed information signal from a television network (i.e., a network feed) and inserts or "splices in" advertising or local programming into the received signal. The resultant spliced signal, which includes network programming and locally inserted material, is then transmitted via terrestrial broadcast to an end user, e.g., an Advanced Television Systems Committee (ATSC) receiver or HDTV receiver.

Specifically, a studio timing source 200 provides a 27 MHz system clock SYSCLOCK, an 8.07 MHz transport data clock TDATCLOCK and three video synchronizing signals; a horizontal H synchronization signal, a vertical V synchronization signal and composite CSYNC synchronization signal. The studio timing source 200 may be used to provide other clock and synchronizing signals, e.g., the 19.93 MHz or 2.4 MHz clocks favored by some equipment manufacturers. It is important to note that all of these clock and synchronization signals are locked to a common reference frequency source (e.g., 27 MHz) within timing source 200, as will be described below with respect to FIG. 2.

A network feed signal S1, including an MPEG-compliant information stream, is transmitted by a satellite 123, received by an antenna 125 and demodulated by a satellite signal demodulator 130. The demodulated network feed signal S3 comprises, e.g., an MPEG-compliant transport stream that has been encoded at the network transmitter (not shown) using one or more known error correction or other encoding schemes (e.g., randomization, Reed-Solomon, Trellis encoding and the like). The demodulated network feed signal S3 and the clock signal TDATCLOCK are coupled to a receiver interface 135. Receiver interface 135 utilizes the transport data clock TDATCLOCK to extract an MPEG transport stream S4 from the demodulated network feed signal S3. The receiver interface 135 may comprise, e.g., a small first-in, first-out (FIFO) memory synchronized to a stable studio timing reference, illustratively, the TDAT-CLOCK. This arrangement allows the satellite feed to be synchronized to the studio reference.

The extracted MPEG transport stream S4 comprises the programming stream that is to be retransmitted (along with any locally-inserted program material or commercials) by the pass-through station. The extracted MPEG transport stream S4 includes a program clock reference (PCR) that was ultimately derived from the common reference frequency source in the timing source 200. Thus, the extracted MPEG transport stream S4 representing the network feed is synchronized at the transport level to the studio timing source 200.

A camera 105 receives "live" image information (e.g., a live news program) via a lens 105L. The camera also receives the horizontal H and vertical V synchronization signals, which are used to format the image information to produce a synchronized image signal S5. A video encoder 110 receives the synchronized image signal S5 and the clock signal SYSCLOCK and produces a video elementary stream S6L. A tape machine 107 is used to play tape containing, e.g., recorded images produced by camera 105. The tape machine 107 receives composite synchronization signal CSYNC to synchronize an output elementary stream S6T. A transport encoder 125 receives the two video elementary streams S6L, S6T and the clock signal SYSCLOCK, selects one of video elementary streams S6L, S6T for encoding, and produces an MPEG-compliant "live feed" transport stream S7. The live feed stream S7 may be in any video format (e.g., 1125 line 30 Hz interlaced, other HDTV, NTSC and the like). Since the transport encoder 115 utilizes the clock signal SYSCLOCK, the timing information (i.e., PCR) of the resultant "live feed" transport stream S7 is synchronized at the transport level to the studio timing source 200.

A play-to-air server 140 (e.g., a video disk, tape machine, or other storage device) stores advertisement and/or local programming. The advertisement and/or local programming information is stored as elementary of packetized elementary video and audio information. The play-to-air server 140 receives the clock signal TDATCLOCK and in response to a control signal PLAY from a controller 125, produces an MPEG-compliant "stored feed" transport stream S8. Since the play-to-air server 140 utilizes the clock signal TDATCLOCK, the timing information (i.e., PCR) of the resultant "stored feed" transport stream S8 is synchronized at the transport level to the studio timing source 200.

A play-to-air switcher (i.e., splicer) 120 receives the MPEG transport streams representing the studio feed S4, the live feed S7 and the stored feed S8. As previously discussed, these three streams S4, S7, S8 have been transport-encoded using clock signals which are derived from a common frequency source. The play-to-air switcher is responsive to a control signal CONT from controller 125 to select one S9 of the streams S4, S7, S8 for subsequent storage and broadcast. It is important to note that the selection of a transport stream in this manner is only possible because the available transport streams S4, S7, S8 are already synchronized, or "genlocked," to the studio reference clock. This means that the PCR time stamps in the respective streams S4, S7, S8 are the temporally aligned (i.e., respective PCR reference packets arriving simultaneously at switcher 120 will be identical).

An off-air recording server 150 receives the selected stream S9 and the clock signal TDATCLOCK. The record server 150 includes a transport stream decoder (not shown) that utilizes the clock signal TDATCLOCK to decode the selected stream S9 to a packetized elementary stream level for storage on a digital storage medium. A vestigial sideband (VSB) transmitter 155 also receives the selected stream S9 and the clock signal TDATCLOCK. The VSB transmitter 155 encodes the selected stream S9 using, e.g., data randomization, Reed-Solomon encoding, interleaving and Trellis encoding. The encoded signal is then modulated using known VSB modulation techniques to produce a VSB modulated signal S10 for broadcast by an HDTV transmitter 160. Since the off-air recording server 150 and VSB transmitter 155 utilizes the clock signal TDATCLOCK, the timing information included in the recorded and broadcast signals will be synchronized.

The pass-through station 100 also includes an HDTV to NTSC converter 165 that scan converts the selected stream S9 to an NTSC signal S11. An NTSC transmitter modulates the NTSC signal S11 using known techniques to produce an NTSC modulated signal S12 for broadcast by an NTSC transmitter 175. The NTSC modulated signal S12 and VSB modulated signal S10 are broadcast simultaneously. The simultaneous broadcast is only required during an NTSC to HDTV transitional period mandated by the Federal Communications Commission (FCC), the U.S. government regulatory agency responsible for radio-spectrum usage.

In the pass-through station 100 of FIG. 1, the play-to-air switcher 120 selects one of the three signals available streams S4, S7, S8 as stream S9 for subsequent storage and broadcast. For example, the network feed stream S4 may include a 20 minute television program which is transmitted in several predetermined portions over a 30 minute time period. The non-program portions (i.e., the 10 remaining minutes) are the portions of the 30 minute time period during which the local affiliate may insert commercials or other information. During the program portions of the 30 minute time period, the network feed S4 is coupled to the transmitters as selected stream S9. During the non-program portions of the 30 minute time period, the stored feed S8 or the live feed S7 may be coupled to the transmitters as selected stream S9. The controller 125 receives the system clock signal SYSCLOCK, determines the appropriate time to switch and, via control signal CONT, causes the switcher 120 to select the desired stream.

The controller 125 optionally receives a monitor signal MON which allows the controller 125 to monitor the data streams received by switcher 120. For example, the controller may be used to determine the format of the network feed signal S4 and responsively provide a signal FORMAT indicative of the determined format. The format indicative signal FORMAT may be used by, e.g., a synchronization generator device which will be described in more detail with respect to FIG. 2.

It is important to note that the selected stream S9 is, in effect, a multiplexed transport stream comprising portions of, e.g., the network feed stream S4 and the stored feed stream S8. The multiplexed stream S9 will not be decoded at the receiver properly if the time stamps of the network S4 and stored S8 streams are not synchronized. The improper decoding produces a timing discontinuity at the switching points in the stream that may cause the decoder to improperly present several frames as timing circuitry within the decoder slews from, e.g., PCR data contained in the network feed S4 to PCR data contained in the stored feed S8. Some decoders sense this timing error and simply produce a "blank" output signal until the decoder timing circuitry adjusts. This condition is not desirable.

In the pass-through station 100 of FIG. 1, the above-described discontinuity error is avoided by "genlocking" the three streams S4, S7, S8 to a common frequency source prior to switching. This "genlocking," or synchronization, means that the selected stream S9 may be decoded properly (i.e., without discontinuities) in a transport decoder even after a switching operation that combines multiple streams produced by different sources. Moreover, the switching operation is greatly simplified since the main criterion for switching is simply the "wall clock" time for inserting a commercial.

The arrangement of FIG. 1 allows a satellite feed to be synchronized to a studio reference. Prior art arrangements required that a satellite feed be decoded to an elementary stream or baseband signal, time-base corrected and coupled to a switcher along with a number of other time-base corrected baseband signals. The selected signal would then be re-encoded and transmitted. This process was cumbersome, expensive and tended to degrade the quality of the selected video or audio signal. The invention avoids this problem.

Figure 2:
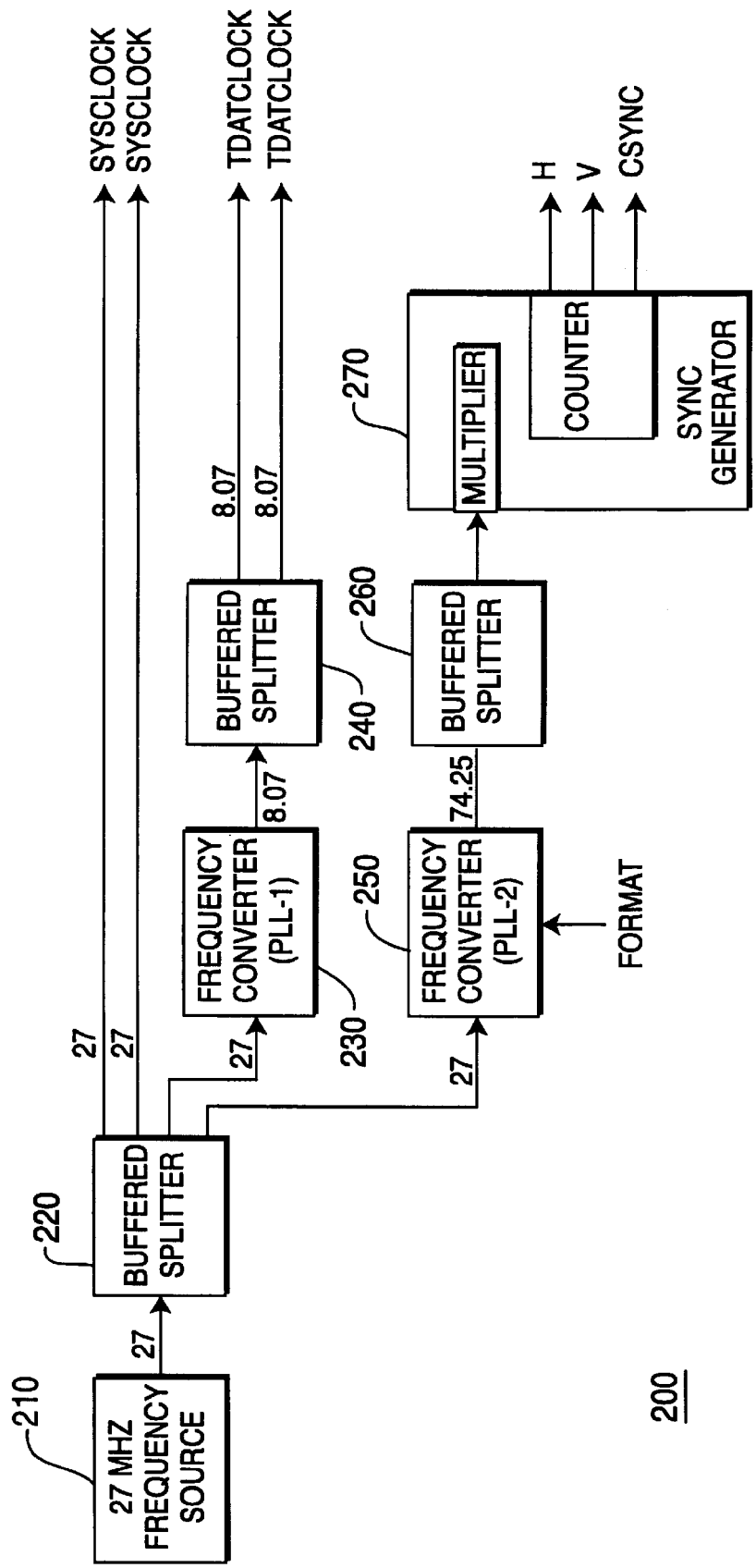
FIG. 2 shows a block diagram of a studio timing source suitable for use in the pass-through station of FIG. 1.

FIG. 2 shows a block diagram of a studio timing source 200 suitable for use in the pass-through station of FIG. 1. Timing source 200 includes a stable reference frequency source 210 (e.g., a 27 MHz source) having an output coupled to a first buffered splitter 220. The buffered splitter receives a 27 MHz signal from the source and provides a plurality of buffered 27 MHz signals at respective outputs. Several buffered 27 MHz output signals (illustratively, two) are coupled to timing source outputs as SYSCLOCK signals. The 27 MHz clock frequency is the standard system clock frequency for an MPEG system. Of course, in non-MPEG systems, the reference clock frequency may be other than 27 MHz.

One of the buffered 27 MHz output signals is coupled to a frequency converter 230, illustratively a phase locked loop (PLL) type, which produces an 8.07 MHz output signal. The 8.07 MHz output signal is buffered by a second buffered splitter 240. Several buffered 8.07 MHz output signals (illustratively, two) are coupled to the timing source outputs as TDATCLOCK signals. The 8.07 MHz clock frequency is the standard clock frequency used for transferring transport packets from one device to another (e.g., from one server to another or from a transport encoder to a splicer).

One of the buffered 27 MHz output signals is coupled to a frequency converter 250, illustratively a phase locked loop (PLL) type, which produces an 74.25 MHz output signal. The 74.25 MHz output signal is buffered by a third buffered splitter 260. A buffered 74.25 MHz signal is coupled to a synchronization generator 270 that generates HDTV horizontal H, vertical V and composite synchronization CSYNC signals and couples these signals to the timing source outputs. The synchronizing signals H, V, CSYNC are generated by counting down the buffered 74.25 MHz signal (i.e., pixel clock signal). The synchronization signals H, V, CSYNC are suitable for use by, e.g., an HDTV camera or tape machine.

It should be noted that by using a 74.25 MHz pixel clock, the synchronization generator 270 of timing source 200 produces synchronization signals H, V, CSYNC that are appropriate for use in the 1125 lines, 30 Hz interlaced HDTV format. Synchronization signals for other HDTV formats or conventional television formats may be generated by changing the output frequency of the frequency converter 250. This change may be made in response to a signal FORMAT which causes the frequency converter 250 to change its output signal frequency. This signal may be provided by, e.g., the controller 225 in the pass-through station 100 of FIG. 1.

The invention has been described within the context of a high definition television (HDTV) pass-through station (e.g., a network affiliate station) that is operative upon MPEG-compliant information streams, including video and audio information streams. The invention provides a cost effective solution for designers of such pass-through stations. For example, a common frequency source is used to derive all the timing signals required by such a station. Moreover, the use of this common frequency source allows the "genlocking" or synchronizing of a network feed carrying MPEG-compliant programming, a server storing MPEG-compliant commercials and a commercial inserter for inserting the commercials into the network feed for subsequent broadcast. In this manner, timing discontinuities are avoided and the station, therefore, does not need to retime the combined signal prior to broadcast. Also, by locking all the output clocks together, the above-described genlock arrangement advantageously prevents an accumulation of jitter in a signal being coupled from one piece of equipment to another (e.g., from a server to a splicer to a VSB modulator). Furthermore, the genlock arrangement allows for control and synchronization of an HDTV camera or tape machine and the insertion of the live or taped information into the network feed.

However, it must be noted that the embodiment of the invention described herein may be modified for use in other compressed data systems where, e.g., it is desirable for a plurality of information processors to operate on respective compressed information signals in a synchronous manner such that it is not necessary to compare baseband or elementary information signals when performing signal splicing or insertion operations.

Although various embodiments which incorporate the teachings of the present invention have been shown and described in detail herein, those skilled in the art can readily devise many other varied embodiments that still incorporate these teachings.

What is claimed is:

1. A method for splicing a first information stream into a second information stream to produce an output information stream, said second information stream and said output information stream comprising transport streams containing compressed digital data, said method comprising the steps of:

generating a timing signal, said timing signal being adapted to recovering a transport stream;

recovering said second information stream using said timing signal;

coupling said recovered second information stream to an output;

producing said first information stream using said timing signal, said first information stream being contemporaneously produced with respect to said recovery of said second information stream; and coupling said recovered first information stream to said output when said first information stream is produced.

2. The method of claim 1 wherein said first information stream is stored in a storage medium and said first information stream producing step further comprises the steps of:

comparing an indicium of real time to a predetermined start time indicium; and producing said first information stream when said indicium of real time matches said predetermined start time indicium.

3. The method of claim 1 wherein said second information stream is received by a receiver and continuously recovered, and said method further comprises the steps of:

comparing an indicium of real time to a predetermined stop time indicium; and coupling said recovered second information stream to said output when said indicium of real time matches said predetermined stop time indicium.

4. The method of claim 1 wherein said timing information signal comprises a transport bitstream data clock.

5. The method of claim 4 wherein:

said first information stream comprises one of either a non-packetized information stream or a packetized information stream having been formed in a manner asynchronous to said second information stream; and said recovering of said first information stream further comprises the step of encoding said first information stream into a transport stream.

6. The method of claim 1 further comprising the steps of:

deriving at least a horizontal synchronizing signal and a vertical synchronizing signal using said timing information signal;

synchronizing a camera using said horizontal and vertical synchronizing signals to produce an image signal; and encoding said image signal using said timing information signal to produce said first information stream.

7. The method of claim 6 further comprising the steps of:

monitoring said second information stream to identify a parameter of said second information stream; and modifying said step of deriving to adapt said horizontal and vertical synchronizing signals to said identified parameter.

8. The method of claim 7 wherein said parameter is a frame rate, and said deriving step comprises the steps of:

multiplying said timing information signal by an amount related to a desired frame rate to produce a resultant clock signal;

detecting cycles of said resultant clock signal;

providing a horizontal synchronizing pulse each time a predetermined number of cycles are detected; and providing a vertical synchronizing pulse each time a predetermined number of horizontal pulses are provided.

9. The method of claim 8 wherein said modifying step comprises the step of adjusting said amount related to said desired frame rate.

10. Apparatus for splicing a first compressed information stream into a second compressed information stream to produce an output information stream, said apparatus comprising:

a timing generator for producing a timing signal, said timing signal being adapted to recovering a transport stream;

a receiver for receiving a signal including said second compressed information stream;

a decoder, coupled to said timing generator and said receiver, for recovering said second compressed information stream from said received signal using said timing signal; and a switch for coupling said first compressed information stream to an output in a first operating mode and coupling said second compressed information stream to said output in a second operating mode.

11. The apparatus of claim 10 further comprising:

a controller coupled to a source of an indicium of real time;

said controller causing said switch to enter said first operating mode when said indicium of real time indicates that a predetermined start time has arrived.

12. The apparatus of claim 11 wherein:

said controller causing said switch to enter said second operating mode when said indicium of real time indicates that a predetermined stop time has arrived.

13. The apparatus of claim 10 wherein said receiver continuously recovers said second information stream, said apparatus further comprising:

a controller coupled to a source of an indicium of real time, said controller causing said switch to enter said first operating mode when said indicium of real time indicates that a predetermined start time has arrived, said controller causing said switch to enter said second operating mode when said indicium of real time indicates that a predetermined stop time has arrived.

14. The apparatus of claim 10 wherein said timing signal comprises a transport bitstream data clock.

15. The apparatus of claim 14 wherein said first compressed information stream source comprises an encoder for encoding an elementary information stream to form said first compressed information stream.

16. The apparatus of claim 10 further comprising:

a synchronization signal generator, coupled to said timing generator, for producing at least a horizontal synchronizing signal and a vertical synchronizing signal using said timing signal;

a camera, coupled to said synchronization signal generator, and using said horizontal and vertical synchronizing signals to produce an image signal; and an encoder, coupled to said camera, for encoding said image signal using said timing signal to produce said first compressed information signal.

17. The apparatus of claim 16 further comprising a controller, coupled to said synchronization signal generator, receiving at least a portion of said second compressed information signal, said controller identifying a parameter of said second compressed information signal, said synchronization signal generator modifying said horizontal and vertical synchronizing signals in response to said identified parameter.

18. The apparatus of claim 17 wherein said parameter is a frame rate and said synchronization signal generator comprises:

a multiplier, for multiplying said timing signal by a predetermined amount related to a desired frame rate to produce a resultant clock signal; and a counter, coupled to said multiplier, for counting cycles of said resultant clock signal;

said counter responsively providing a horizontal synchronizing pulse each time a predetermined number of cycles are counted and providing a vertical synchronizing pulse each time a predetermined number of horizontal pulses are provided.

19. The apparatus of claim 18 wherein:

said synchronization signal generator modifies said horizontal and vertical synchronizing signals by modifying said predetermined number of horizontal pulses, said predetermined number of horizontal pulses being related to a desired frame rate.

20. In a digital television processing system receiving an input transport stream, a method for forming an output transport stream by multiplexing said input transport stream and one or more of a plurality of information streams, said output transport stream and each of said plurality of information streams including timing information indicative of a temporal ordering of respective included information packets, said method comprising the steps of:

generating a transport clock signal using a timing reference source;

using said transport clock signal to couple said received transport stream to a multiplexer input; and in a first mode of operation:

using said transport clock signal to transport encode a first of said plurality of information streams to produce a first transport stream; and using said transport clock signal to couple said first transport stream to a multiplexer output;

in a second mode of operation:

using said transport clock signal to couple said received transport stream to said multiplexer output; wherein said timing information included within said output transport stream indicates a substantially continuous temporal ordering of included information packets.

21. The method of claim 20, wherein said first of said plurality of information streams is encoded contemporaneously with the reception of said received transport stream.

22. The method of claim 20, wherein said step of transport encoding said first of said plurality of information streams comprises the steps of:

comparing an indicium of real time to a predetermined start time indicium;

retrieving, from a storage device, said first of said plurality of information streams when said indicium of real time compares favorably to said predetermined start time indicium; and transport encoding said first of said plurality of information streams; wherein said timing information included within said first transport encoded stream and said received transport stream are contemporaneously indicative of a substantially equivalent temporal ordering of said respective included information packets.

23. The method of claim 20, wherein said step of transport encoding said first of said plurality of information streams comprises the steps of:

comparing an indicium of real time to a predetermined start time indicium;

retrieving, from a camera, said first of said plurality of information streams when said indicium of real time compares favorably to said predetermined start time indicium; and transport encoding said first of said plurality of information streams; wherein said timing information included within said first transport encoded stream and said received transport stream are contemporaneously indicative of a substantially equivalent temporal ordering of said respective included information packets.

24. The method of claim 20, wherein:

said first information stream comprises one of either a non-packetized information stream or a packetized information stream having been formed in a manner asynchronous to said received transport stream.

25. The method of claim 20, further comprising the steps of:

deriving at least a horizontal synchronizing signal and a vertical synchronizing signal using said transport clock signal;

synchronizing a camera using said derived horizontal and vertical synchronizing signals to produce said first of said plurality of information streams.

26. The method of claim 25, wherein said step of transport encoding said first of said plurality of information streams comprises the steps of:

comparing an indicium of real time to a predetermined start time indicium;

retrieving, from said camera, said first of said plurality of information streams when said indicium of real time compares favorably to said predetermined start time indicium; and transport encoding said first of said plurality of information streams; wherein said timing information included within said first transport encoded stream and said received transport stream are contemporaneously indicative of a substantially equivalent temporal ordering of said respective included information packets.

27. The method of claim 20, wherein said further comprising the steps of:

in a third mode of operation:

using said transport clock signal to transport encode a second of said plurality of information streams to produce a second transport stream; and using said transport clock signal to couple said second transport stream to said multiplexer output.

28. The method of claim 27, wherein:

said step of transport encoding said first of said plurality of information streams comprises the steps of:

comparing an indicium of real time to a first predetermined start time indicium;

retrieving, from a storage device, said first of said plurality of information streams when said indicium of real time compares favorably to said first predetermined start time indicium; and transport encoding said first of said plurality of information streams;

said step of transport encoding said second of said plurality of information streams comprises the steps of:

comparing said indicium of real time to a second predetermined start time indicium;

retrieving, from a camera, said second of said plurality of information streams when said indicium of real time compares favorably to said second predetermined start time indicium; and transport encoding said second of said plurality of information streams; wherein said timing information included within said first transport encoded stream, said second transport encoded stream and said received transport stream are contemporaneously indicative of a substantially equivalent temporal ordering of said respective included information packets.

29. The method of claim 28, wherein:

said first operating mode being entered when said indicium of real time compares favorably to said first predetermined start time indicium; and said second operating mode being entered when said indicium of real time compares favorably to said second predetermined start time indicium.

30. The method of claim 29, further comprising the steps of:

comparing said indicium of real time to a third predetermined start time indicium;

said second operating mode being entered when said indicium of real time compares favorably to said third predetermined start time indicium.

31. The method of claim 29, wherein information defining said third predetermined start time indicium is included within said received transport stream.

32. The method of claim 25 further comprising the steps of:

monitoring said received transport stream to identify a video frame rate parameter of said second information stream; and modifying said step of deriving to adapt said horizontal and vertical synchronizing signals to said identified video frame rate parameter.

33. The method of claim 32 wherein step of deriving comprises the steps of:

multiplying said transport clock signal by an amount related to a desired frame rate to produce a resultant clock signal;

detecting cycles of said resultant clock signal;

providing a horizontal synchronizing pulse each time a predetermined number of cycles are detected; and providing a vertical synchronizing pulse each time a predetermined number of horizontal pulses are provided.

\* \* \* \* \*